428-58 AU 156 EX
1/7/86 XR RE 32,061

United States Patent [19]
Ellingson, Jr.

[11] E Patent Number: Re. 32,061
[45] Reissued Date of Patent: Jan. 7, 1986

[54] COUPLING MEMBER FOR FLOOR COVERING SECTIONS

[75] Inventor: Chester W. Ellingson, Jr., Burnsville, Minn.

[73] Assignee: Reese Enterprises, Inc., Rosemount, Minn.

[21] Appl. No.: 619,390

[22] Filed: Jun. 11, 1984

Related U.S. Patent Documents

Reissue of:
[64] Patent No.: 4,381,324
Issued: Apr. 26, 1983
Appl. No.: 356,336
Filed: Mar. 9, 1982

[51] Int. Cl.[4] ..... E04C 1/30; E04F 15/16
[52] U.S. Cl. ..... 428/52; 52/71; 52/177; 52/586; 428/58; 428/192
[58] Field of Search ..... 428/52, 57, 62, 192, 428/58; 52/71, 177, 181, 585, 586; 15/215, 217

[56] References Cited

U.S. PATENT DOCUMENTS

| | | | |
|---|---|---|---|
| 2,202,636 | 5/1940 | McClelland | 20/78 |
| 2,680,698 | 6/1954 | Schnee | 154/49 |
| 3,435,480 | 4/1969 | Mann, Jr. | 15/215 |
| 3,783,471 | 1/1974 | McGeary et al. | 15/215 |
| 3,846,945 | 11/1974 | Roby | 52/177 |
| 3,909,996 | 10/1975 | Ettlinger, Jr. et al. | 52/177 |
| 4,029,834 | 6/1977 | Bartlett | 428/62 |
| 4,381,324 | 4/1983 | Eillingson | 428/58 |

*Primary Examiner*—Paul J. Thibodeau
*Attorney, Agent, or Firm*—Leo Gregory

[57] ABSTRACT

A floor covering, as for indoor public walking areas, being made up of sections, each section being substantially rectangular in plan, having a fairly narrow width and being disposed in closely spaced parallel relationship. Coupling members not unlike double hinges connect adjacent sides of the sections, the coupling members being particularly arranged to permit a compact rollup of the sections for cleaning purposes.

4 Claims, 5 Drawing Figures

COUPLING MEMBER FOR FLOOR COVERING SECTIONS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to floor coverings for public indoor walking areas and more particularly to means for pivotally connecting sections of floor coverings.

2. Description of the Prior Art

It is a common practice to provide floor coverings for general walking areas as in office buildings and other public buildings. Such floor coverings are generally adapted to be rolled up for cleaning purposes.

A prior art structure is disclosed in U.S. Letters Pat. No. 4,029,834 issued June 14, 1977, to G. F. Bartlett. Here what are described as rails form the portions of a mat, said portions being directly interconnected and end portions thereof are tapered to become flush with adjacent floor surface.

SUMMARY OF THE INVENTION

The invention herein relates to an indoor floor covering for public walk areas, the floor covering consisting of like sections, each having a suitable tread surface and being particularly constructed to be connected to each other by coupling members which are designed to allow substantial flexibility in rolling up the sections as for cleaning purposes.

More particularly it is an object of this invention to provide a floor covering for use as in public walking areas, the floor covering consisting of rectangular sections of identical structure, each section having side edge portions formed as hinge pin receptacles or sockets, the same having slot openings along their outer sides and a coupling member having closely spaced rod-like side portions not unlike hinge pins and being adapted to be disposed into and pivotally connect adjacent pairs of said sockets, said rod-like portions being connected by a web, said web being disposable through said slot openings and providing sufficient space within said slots for a free pivotal movement for a compact rollup of said floor covering.

These and other objects and advantages of the invention will be set forth in the following description made in connection with the accompanying drawings in which like reference characters refer to similar parts throughout the several views.

DESCRIPTION OF A PREFERRED EMBODIMENT

Referring to the FIGS., a broken floor area 6 is shown having disposed therein a floor covering 10 which is comprised of sections 12 disposed in a closely spaced parallel relationship and being respectively connected to each other by coupling members 14, all to be further described.

Figure 1:
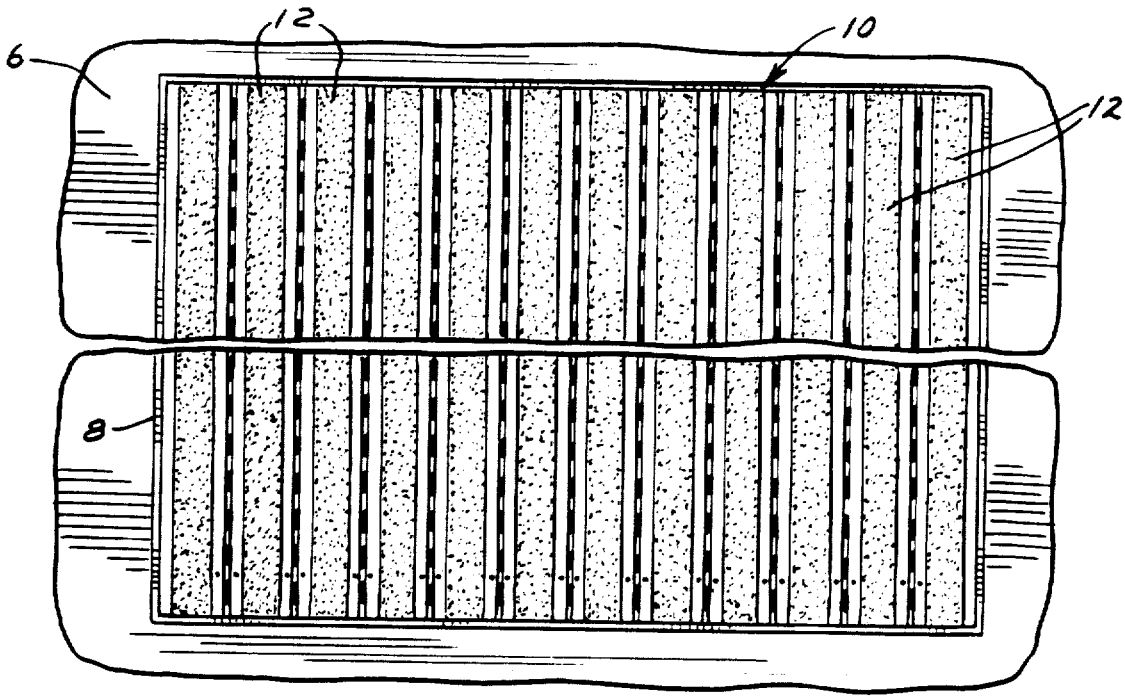
FIG. 1 is a broken plan view showing an arrangement of mat members in operating position.
Figure 2:
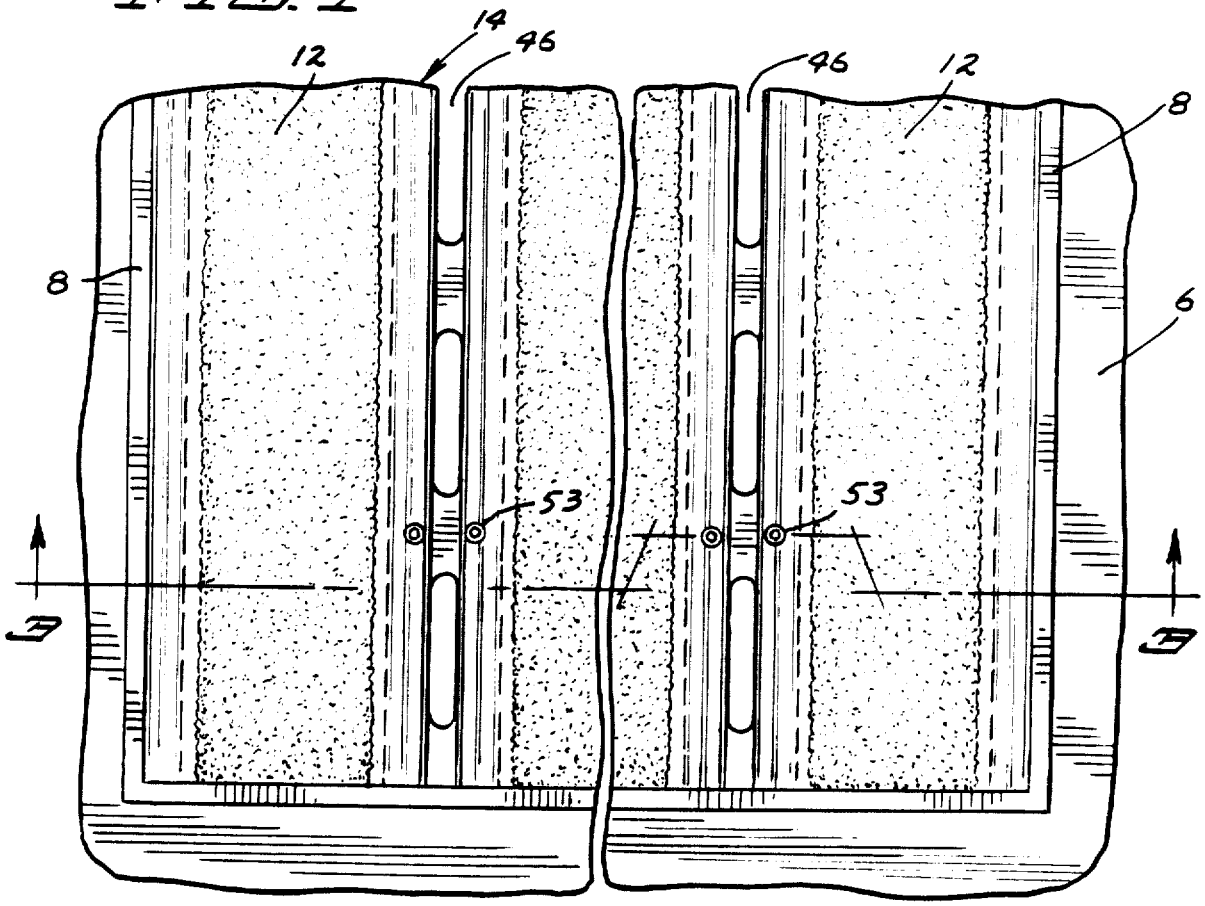
FIG. 2 is a fragmentary view showing on an enlarged scale details of structure.
Figure 3:
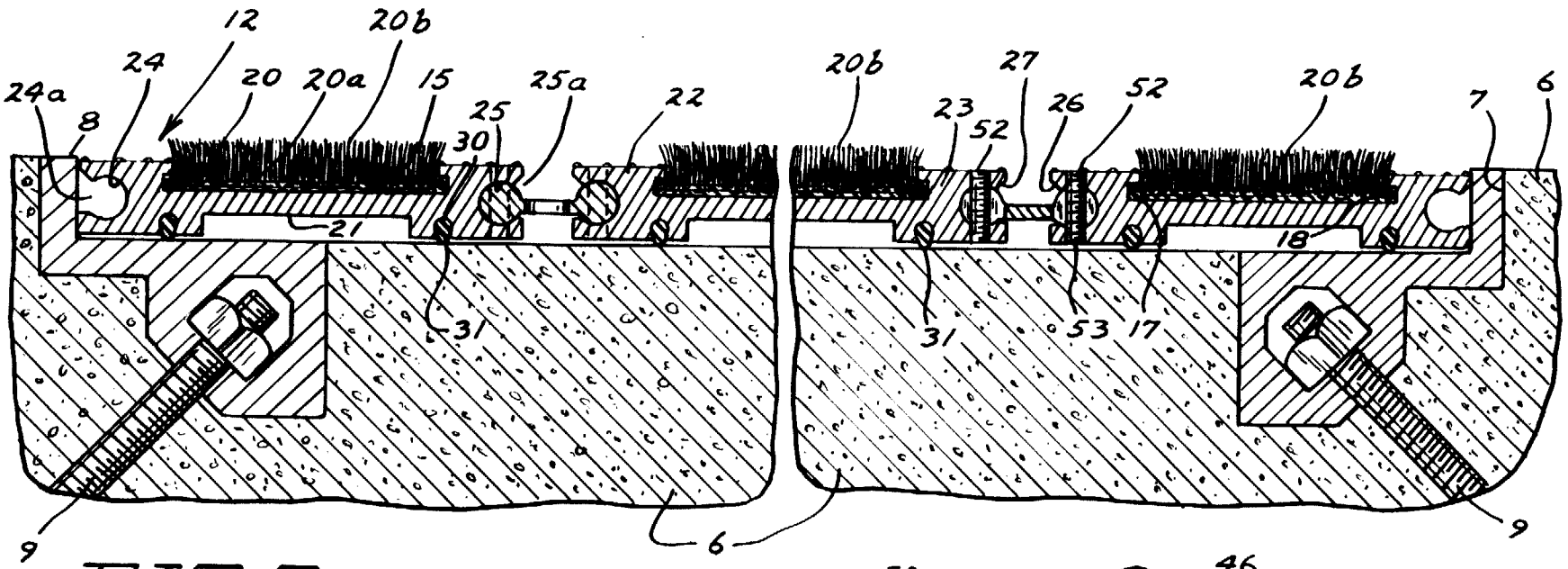
FIG. 3 is a view in vertical cross section taken on line 3—3 of FIG. 2 as indicated.
Figure 4:
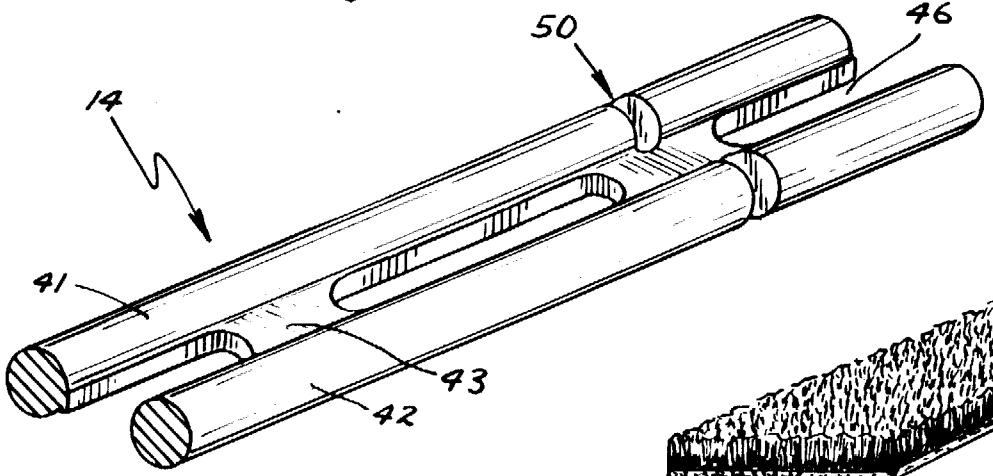
FIG. 4 is a perspective view showing details of structure of a coupling member on an enlarged scale.
Figure 5:
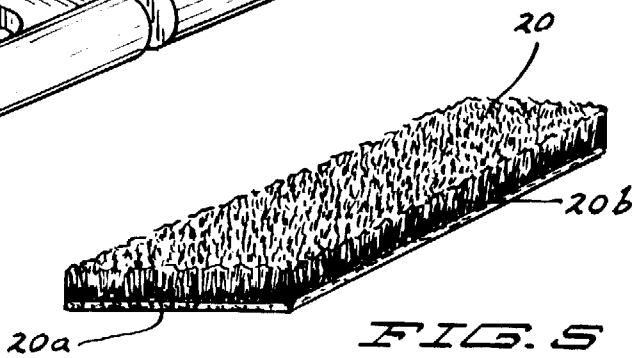
FIG. 5 is a fragmentary perspective view of a detail of structure.

Referring particularly to FIGS. 1 and 3, the floor area to be covered is recessed as at 7 which preferably is done during initial construction work and the periphery of the recessed area has a conforming angled frame member 8 set therein which is conventionally secured as by concrete anchor bolts 9. Said frame member will be of a size to accommodate therein a given number of sections 12. The sections may be of any desired length. The recessed area will be of a depth to correspond to the height of said sections.

A section 12 will be described as representative of all such sections. Said section 12 is formed preferably as an extrusion such as of aluminum in which, as illustrated in the present embodiment, there is a central longitudinal recess 15, the same having therein laterally opposed facing recessed grooves 17 and 18 at the sides thereof to receive the edge portions of tread strips such as formed by vinyl or as here shown by carpeting strips 20, the backing 20a with the pile or nap 20b thereon being received within said grooves which will be of sufficient height to accommodate a compressed edge portion of the nap together with the backing thereunder. A substantially corresponding bottom recess 21 is shown formed for the purpose of saving material.

Extending oppositely outwardly at each side of recess 15 for the full height of said sections are flanged portions 22 and 23 which may have a smooth or configured upper surface as may be desired. The flange edge portions are shown having sockets 24 and 25 formed therein the full length thereof, said sockets being circular in cross section and having slotted open sides 24a and 25a, the openings being of a height less than the diameter of said socket. Said openings are here shown flared as at 26 and 27.

If so desired, an underlying cushion effect may be achieved by having resilient rib members 30 partially embedded into corresponding grooves, such as 31.

Said sections are of identical construction and as shown in FIG. 3, said sections are connected in closely spaced relation by the coupling members 14 of which one will be described as representative of all.

Said coupling members are conveniently formed by extrusion and preferably will be formed of a material such as of aluminum. Said coupling members as here shown comprise parallel closely spaced rod-like portions or rods 41 and 42 which are analogous to hinge pins, the same being connected by webs 43 of substantially reduced thickness. Said webs preferably are shown separated by space or cut-outs as at 46 to permit contaminants to fall through. Preferably said coupling members will be of a length to correspond to that of said sections 12.

Said rods 41 and 42 will be disposed through the sockets 24 and 25 of adjacent edge portions of pairs of said sections, as illustrated in FIG. 3, on the order of a double hinge connection, with the web having a thickness substantially less than the width of the slot openings 24a and 25a to permit a substantial pivotal or rotational movement for rolling up the sections.

At spaced intervals, a vertical slot 50 is cut through rods 41 and 42 and as here shown the slots are transversely aligned in pairs at each side of a web 43. In the flanges 22 and 23 corresponding holes 52 will be tapped wherein a metal screw 53 such as an Allen screw may be inserted to extend through a slot 50 to prevent relative movement between said coupling members and said sections 12.

As is clear from the foregoing description, the floor covering herein is particularly adapted to be installed into a recessed floor area to have the floor covering level with the adjacent surface area.

The particular improvement herein is present in having like floor sections all connected in like manner by the coupling members. The coupling members provide a double hinge like connection between adjacent sections resulting in a nicely compacted rollup of the floor covering.

It will be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A floor covering consisting of coupled sections, having in combination a floor covering section substantially rectangular in plan, a flange formed at each side edge portion of said section, each flange having a longitudinal bore therethrough, said bores respectively having oppositely facing slots, a coupling member comprising a pair of closely spaced rods, a web connecting said rods, said web having a thickness less than the height of said slots, said rods respectively being disposed through adjacent pairs of said slots connecting a pair of said sections [, and]

*said rods having rotary movement in said slots, and* a tread surface carried by said sections.

2. The structure of claim 1, including means securing said rods within said bores preventing relative longitudinal movement thereof.

3. The structure of claim 1, wherein said web has cut out spaces therein.

4. The structure of claim 1, wherein said flanges having a recessed area therebetween, and a tread including said tread surface disposed into said recessed area.

* * * * *